(12) United States Patent
Damson et al.

(10) Patent No.: US 6,167,755 B1
(45) Date of Patent: Jan. 2, 2001

(54) DEVICE FOR DETERMINING LOAD IN AN INTERNAL COMBUSTION ENGINE

(75) Inventors: Eckhart Damson, Gerlingen; Helmut Denz, Stuttgart; Martin Klenk, Backnang; Werner Herden, Gerlingen; Winfried Moser, Ludwigsburg; Matthias Kuesell, Kornwestheim, all of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 08/335,084

(22) Filed: Nov. 7, 1994

(30) Foreign Application Priority Data

Dec. 14, 1993 (DE) .................................................. 43 42 588

(51) Int. Cl.$^7$ .................................................. G01M 15/00
(52) U.S. Cl. ........................................... 73/117.3; 73/115
(58) Field of Search .................................. 73/116, 117.3, 73/115, 35

(56) References Cited

U.S. PATENT DOCUMENTS

| | | | |
|---|---|---|---|
| 4,527,422 | * 7/1985 | Honig et al. | 73/117.3 |
| 4,625,690 | * 12/1986 | Morita | 123/340 |
| 4,760,825 | * 8/1988 | Morita | 123/340 |
| 4,913,118 | * 4/1990 | Watanabe | 73/117.3 |
| 4,991,554 | * 2/1991 | Wataya | 73/117.3 |
| 5,116,259 | * 5/1992 | Demizu et al. | 73/117.3 |
| 5,226,323 | * 7/1993 | Wakayama | 73/116 |
| 5,359,883 | * 11/1994 | Baldwin et al. | 73/117.3 |

FOREIGN PATENT DOCUMENTS

| | | |
|---|---|---|
| 3527856 | 2/1986 | (DE) . |
| 4001362 | 8/1990 | (DE) . |
| 0399069 | 11/1990 | (EP) . |
| 0615117 | 9/1994 | (EP) . |

OTHER PUBLICATIONS

Hudson and Nelson, *University Physics*, pp. 460, 461 and 464–468, Harcourt Brace Jovanovich, New York, 1982.*

* cited by examiner

*Primary Examiner*—George Dombroske
(74) *Attorney, Agent, or Firm*—Michael J. Striker

(57) ABSTRACT

The device for determining load in internal combustion engines includes a pressure sensor connected with a combustion chamber of an internal combustion engine which produces an output signal depending on a combustion chamber pressure, a crankshaft angle sensor for detection of a crankshaft angle of the internal combustion engine and a processor for determining a load of the engine from relative values of the output signal of the pressure sensor at predetermined crankshaft angles. The processor includes a device for determining the load from a pressure difference between combustion chamber pressures measured at two different predetermined crankshaft angles (x1, x2) or from two integrated pressure values. The integrated relative pressure values are obtained by integration of a pressure-proportional output signal of the pressure sensor between two different predetermined crankshaft angles.

15 Claims, 1 Drawing Sheet

DEVICE FOR DETERMINING LOAD IN AN INTERNAL COMBUSTION ENGINE

BACKGROUND OF THE INVENTION

The present invention relates a device for determining load in an internal combustion engine.

A device for determining load in an internal combustion engine is known and comprises a pressure sensor which is located in a combustion chamber of an internal combustion engine and which generates an output signal depending on combustion chamber pressure, a crankshaft angle sensor for detection of the crankshaft angle and processor means for determining the load from the output signal of the pressure sensor at predetermined crankshaft angles.

Information regarding engine operation is required for control of the internal combustion engine. This information is obtained with the help of suitable sensors. The important parameters for operation of the internal combustion engine such as ignition time, fuel injection times and exhaust gas feedback rates are determined according to this information and stored as a characteristic operating value array. The load and the rotation speed must be known to find the actual necessary information, since the characteristic operating values are engine load and rotation speed dependent.

Air flow rate meters, air mass meters, throttle valve sensors or suction pressure sensors are used as load sensors. The air flow rate of the air drawn into the cylinders is determined by the control unit of the internal combustion engine with the help of these highly accurate sensors. With this type of sensor however only the total air flow rate into all the cylinders is determined. It is not possible to determine the flow rate to each individual cylinder.

It is also possible to determine load using a combustion chamber sensor in each cylinder of the internal combustion engine. The combustion chamber pressure in the cylinder depends on the amount of gas which is compressed in the compression stroke and which is subsequently reacted. For example in the disclosure in German Published Patent Application DE-OS 35 27 856 the absolute pressure in a cylinder at a predetermined crankshaft angle is input as an input variable for calculation of the load. The equation of state for a real gas is used for this calculation.

It is also known from the disclosure in German Published Patent Application DE-OS 40 01 362 in connection with a method for load determination that the temperature of the air mass drawn into the cylinders is an important input variable in the equation used for calculating the load and thus must also be measured. Thus a temperature sensor is provided in addition to a load sensor (combustion chamber pressure sensor) and measures the temperature of the air drawn into the cylinders. These measured values are then used for an exact load determination.

Many problems exist in the state of the art methods for determination of absolute pressure. Absolute pressure sensors are required, which can hardly be provided for the conditions present in the internal combustion engine or only at very high cost, so that a load determined by combustion chamber pressure sensors is scarcely possible.

SUMMARY OF THE INVENTION

It is an object of the instant invention to provide a device for load determination in an internal combustion engine which does not have the above-described disadvantages.

This object and others which will be made more apparent hereinafter is attained in a device for determining load in an internal combustion engine comprising a pressure sensor located in a combustion chamber of an internal combustion engine which generates an output signal depending on combustion chamber pressure, a crankshaft angle sensor for detection of the crankshaft angle of the internal combustion engine and processor means for determining load from the output signal of the pressure sensor at predetermined crankshaft angles.

According to the invention the processor means includes means for determining the load from a pressure difference between combustion chamber pressures measured at two different predetermined crankshaft angles (x1,x2) or from two pressure integral values. The pressure integral values are obtained by integrating a pressure-proportional output signal of the pressure sensor between two different predetermined crankshaft angles. Absolute pressure values are not necessary.

The device according to the invention has the advantage that the load can be determined from the output signal of at least one combustion chamber pressure sensor or a combustion chamber pressure sensor for each cylinder economically and reliably. This is possible because the absolute pressure does not need to be determined, but only the relative pressure values, which are derivable from the output signal from the pressure sensor.

The load is thus determined in an advantageous manner from a pressure difference or an integrated pressure value during the compression stroke and, if necessary, also in the intake stroke. The measurement of an exact course of the pressure occurs only within a certain predetermined region of operation, advantageously during the first 360° crankshaft angle and then determinations are possible over the entire pressure range. This also means that errors such as temperature change, scatter and shift of the null point as well as thermal errors by combustion do not in themselves effect the load determination.

An additional advantage is that the phase shifts, which for example are caused by the dynamic upper dead point error, which are still present in the measurement of the evolution of the pressure, are automatically corrected when the pressure difference and/or integrated pressure values are used.

Additional features of the preferred embodiments are apparent from the description provided hereinbelow.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENTS

Figure 1:
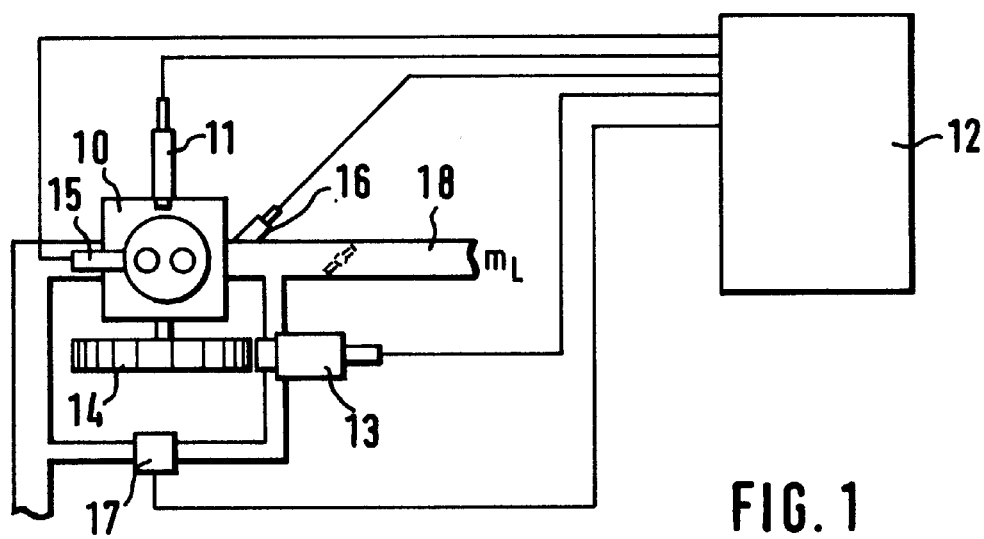
FIG. 1 is a schematic diagram of a device according to the invention for determining load in an internal combustion engine.

Components of an internal combustion engine are shown diagrammatically for illustration of the invention in FIG. 1 and these components include a cylinder 10 of the internal combustion engine. A pressure sensor 11 is connected to the cylinder 10, which measures the combustion chamber pressure in the cylinder 10. This pressure sensor 11 generates an output signal U(p) which is fed to a control device 12 and which is proportional to pressure, p.

The relative pressure is processed in the control device 12 synchronously with the crankshaft rotation, since the digital measurement is timed with the aid of a crankshaft angle sensor 13. The crankshaft angle sensor 13 senses or detects motion of a toothed rim 14, which rotates synchronously with the crankshaft. The output signal of the crankshaft angle sensor 13 is a square wave signal whose high-low phases reflect the shape of the toothed rim 14.

The required signals for the measurement synchronized to the crankshaft are produced by suitable sides of the pulses of this square wave signal. The rotation speed of the internal combustion engine is determined in a known way by evaluating the time intervals between the same type of sides of the pulses of the rotation dependent square wave signal of the angle sensor 13.

The signals of the pressure sensor 11 and those of the angle sensor 13 are fed to and processed in control device 12 to determine the air mass $m_L$ fed to the suction pipe 18. The supplied air mass $m_L$ can be determined from the pressure differences and/or the integrated pressure signal. How the pressure differences and/or the pressure integrals are exactly calculated and/or how the input air mass $m_L$ is calculated is illustrated with the help of FIG. 2.

For example, ignition time, fuel injection time and exhaust gas feedback rates are calculated in the central processor unit (CPU) of the control device 12 from the characteristic operating value array stored in memory as a function of the rotation speed and pressure difference and/or the pressure integral and/or the air mass determined from those values. The spark generated at the spark plug 15, the amount of fuel injected through the injection valve 16 and the exhaust gas feedback rate at the exhaust gas feedback valve 17 are adjusted and determined according to the characteristic operating values.

The device shown in FIG. 1 can detect and eliminate the feed rate differences of the individual cylinders of an internal combustion engine in an embodiment in which a pressure sensor is provided for each cylinder. It is thus possible to lower the fuel consumption and the emissions of the engine. Furthermore other more expensive load sensors can be eliminated.

A combustion chamber pressure sensor, which supplies the operating parameters for the entire motor, can be arranged in only one cylinder of the internal combustion engine to provide a simple and particularly economical system in a preferred embodiment of the device according to the invention.

Figure 2:
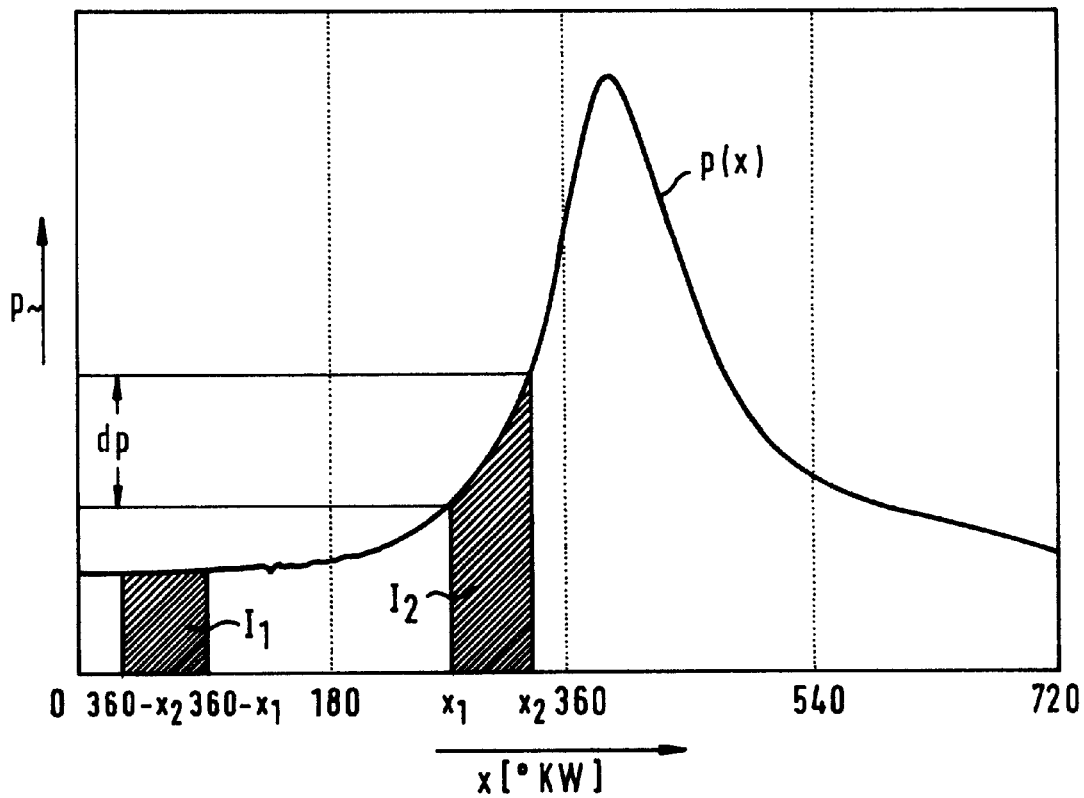
FIG. 2 is a graphical illustration of the behavior of pressure versus crankshaft angle in an internal combustion engine.

The behavior of the output signal U(p) obtained from the pressure sensor which shows the dependence of cylinder pressure p on the crankshaft angle x is illustrated in FIG. 2. The pressure signal p(x) is relatively constant during the intake stroke and it climbs rapidly in the compression stroke and reaches its maximum in the combustion stroke. After the combustion and the exhaust stroke the pressure falls again.

Additional variables besides the pressure are introduced in FIG. 2, which are essential for the evaluation according to the invention. First the pressure difference dp and the pressure intregral values $I_1$ and $I_2$ are introduced. These pressure integral values $I_1$ and $I_2$ are intregrals of pressure over the crankshaft angle x or over the associated cylinder volume V. They are to be calculated from the behavior of the pressure according to the following equations:

$$dp = p(x_2) - p(x_1) \quad (1)$$

$$I_{px} = I_{2x} - I_{1x} \quad (2)$$

wherein:

$$I_{2x} = \int_{x1}^{x2} p(x)dx$$

and $$I_{1x} = \int_{360-x2}^{360-x1} p(x)dx$$

or alternatively $$I_{pV} = I_{2V} - I_{1V} \quad (3)$$

wherein $$I_{2V} = \int_{x1}^{x2} p(x)dV$$

and $$I_{1V} = \int_{360-x2}^{360-x1} p(x)dV$$

Two possibilities are thus conceivable for determining the load from the measured combustion chamber pressure behavior. The first of the two possible ways includes measurement of the load with the help of an analysis of the pressure difference, dp, as defined in Equation (1). The second possibility includes determination of the load with the help of one or more of the pressure integrals.

Both methods are based on a knowledge of the combustion chamber pressure behavior and that it repeats itself after four strokes. The foregoing leads to the following process steps:

1. Determination of Load Based on Pressure Difference

The pressure is measured at crankshaft angle x1 and the crankshaft angle x2 for determination of the pressure difference dp. Both crankshaft positions x1 and x2 are in a compression stroke. The crankshaft position x2 advantageously corresponds to the earliest ignition time, e.g. 340°. The crankshaft angle x1 should be sufficiently ahead of x2, so that the pressure difference is as large as possible, however the crankshaft position x1 should not be in the vicinity of the pressure fluctuation noise due to valve motion or the like. A particularly good choice for the crankshaft angle x2 is 300°. From the real gas equation for both crankshaft positions the gas mass $m_G$ is given by the following:

$$m_G = \frac{p(x1)V(x1)}{R(x1)T(x1)}$$

and $$m_G = \frac{p(x2)V(x2)}{R(x2)T(x2)}$$

Because of equation (1) and the following relationship between masses $$m_G = m_L + m_K + m_R \text{ where } x2 > x1 \quad (4)$$

the air mass $m_L$ can then be calculated according to equation (5) herein below:

$$m_L = m_G - m_K - m_R \quad (5)$$

wherein $$\frac{1}{m_G} = \frac{R(x2)T(x2)}{dpV(x2)} - \frac{R(x1)T(x1)}{dpV(x1)}$$

This equation (5) can also be formulated with the help of a correction factor $f_{Lpk}$ as follows:

$$m_L = dp \, f_{Lpk} - m_K \quad (6)$$

wherein $$f_{Lpk} = \frac{1}{\frac{R(x2)T(x2)}{V(x2)} - \frac{R(x1)T(x1)}{V(x1)}} - m_R/dp.$$

The correction factor $f_{Lpk}$ is a function of the gas temperature, the volume, the gas constant and the residual gas mass. Since the correction factor $f_{Lpk}$ is calculated only with some difficulty it is advantageous to store this correction factor in a characteristic variable array as a function of the rotation speed n and the pressure difference dp so as to make it available in the control device.

The correction factor $f_{Lpk}$ describes the effect of the variable factors, the polytropic exponent, the gas constant and the temperature.

A particularly simple and economical device according to the invention can be provided when the air mass is not explicitly derived from the pressure difference, but when the ignition times, fuel injection times and exhaust gas feed back rate are stored directly as a function of the pressure difference and rotation speed.

2. Load Determination from Integrated Pressure Values

A second possibility for load determination from the combustion chamber pressure consists in evaluation based on the integrated pressure values $I_{px}$. Two of these integrals are formed at different crankshaft angle regions. The crankshaft angle regions x2=360° and x1=180° are especially suitable. The integral $I_2$ then represents the average compression pressure, which is a function of the gas mass. The average intake pressure, which is determined from the intergal $I_1$, is derived from this integral and is also a function of the gas mass. A relative parameter is thus derived which is independent of temperature and other effects.

The average intake pressure is obtained from an integral over the pressure during an intake stroke with integration limits for example of 360°-x2 and 360°-x1. Both integrals are represented with $I_1$ and $I_2$.

The crankshaft angle positions shown in FIG. 2 can be varied within known ranges. For example it is also possible to use the crankshaft angles x2=340° and x1=300°. The limits for the integration are adjusted accordingly. It is also possible to determine the load state from only the integrated pressure values between two crankshaft angle limiting positions in the region of increasing pressure in the first 360°.

Furthermore it is also possible to form the pressure integral as a sum of a part of the intake work and a part of the compression work.

Moreover the integration must be performed over volume and then leads to a load characteristic variable $I_{pv}$ which can be formed with the help of the volume at the crankshaft angle positions x1 and x2. When x2=360° and x1=180°, the integral is the sum of the intake work and the compression work.

The connection between the pressure integral and the air mass $m_L$ is again readily available from the characteristic field. The integral formed has the advantage that it is scarcely effected at all by the noise in the pressure signal, particularly signal spikes or rapid fluctuations from noise sources are averaged out by the integration.

In an especially simple and economical embodiment the air mass is not explicitly derived from the pressure integral, but the ignition times, fuel injection times and exhaust gas feed back rates are stored directly in an operating variable array as a function of the pressure integral values and the rotation speed n.

Also other operating parameters which are required for control of an internal combustion engine, can be obtained from the signal and/or signals depending on the combustion chamber pressure besides the load. The rotation speed of the engine which can be obtained from the time interval between two pressure maximum or other characteristic signal locations, is another example. This is especially significant for emergency operation in which the rotation speed sensor fails.

While the invention has been illustrated and described as emobodied in a device for determining load in an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. Device for determining load in internal combustion engines, said device comprising a pressure sensor connected with a combustion chamber of an internal combustion engine, said pressure sensor having means for producing an output signal depending on a combustion chamber pressure of said combustion chamber, a crankshaft angle sensor for detection of a crankshaft angle of the internal combustion engine and processor means for determining a load of said internal combustion engine, wherein said processor means include means for determining said load from a pressure difference between two of said combustion chamber pressures, said two combustion chamber pressures forming said pressure difference being measured at two different predetermined ones of said crankshaft angle (x1, x2).

2. Device for determining load in internal combustion engines, said device comprising a pressure sensor connected with a combustion chamber of an internal combustion engine, said pressure sensor having means for producing an output signal depending on a combustion chamber pressure of said combustion chamber, a crankshaft angle sensor for detection of a crankshaft angle of the internal combustion engine and processor means for determining a load of said internal combustion engine, wherein said processor means includes means for determining said load from a difference between two pressure integral values, each of said pressure integral values being obtained by integration of said output signal of said pressure sensor between two different predetermined ones of said crankshaft angles.

3. Device as defined in claim 2, wherein said processor means comprises a control device of the internal combustion engine.

4. Device as defined in claim 1, wherein said processor means comprises a control device of the internal combustion engine.

5. Device as define in claim 1, wherein said processor means includes means for determining an air mass ($m_L$) from said pressure difference between said two combustion chamber pressures measured at said two different predetermined crankshaft angles and a real gas equation of state.

6. Device as define in claim 2, wherein said processor means includes means for determining an air mass ($m_L$) from at least one of said two pressure integral values and a real gas equation of state.

7. Device as defined in claim 1, wherein said processor means includes means for determining values of a correction factor ($f_{Lpk}$) said correction factor being a function of gas temperature, volume, a gas constant and a residual gas mass; means for storing said values of said correction factor ($f_{Lpk}$) in a characteristic value array as a function of said rotation speed of said internal combustion engine and of said pressure difference.

8. Device as defined in claim 2, wherein said processor means includes means for determining values of a correction factor ($f_{Lpk}$) said correction factor being a function of gas temperature, volume, a gas constant and a residual gas mass; means for storing said values of said correction factor ($f_{Lpk}$) in a characteristic value array as a function of said rotation speed of said internal combustion engine and said pressure integral values.

9. Device as defined in claim 1, wherein said processor means includes characteristic value means for determining said load as a function of rotation speed of said internal combustion engine and said pressure difference.

10. Device as defined in claim 2, wherein said processor means includes characteristic value means for determining said load as a function of rotation speed of said internal combustion engine and from at least one of said pressure integral values.

11. Device as defined in claim 1, wherein said processor means includes means for determining operating parameters of said internal combustion engine from rotation speed of said internal combustion engine and said pressure difference.

12. Device as defined in claim 2, wherein said processor means includes means for determining operating parameters of said internal combustion engine from and from at least one of said pressure integral values.

13. Device as defined in claim 11, wherein said operating parameters include at least one of ignition times, fuel injection times and exhaust gas feedback rates.

14. Device as defined in claim 12, wherein said operating parameters include at least one of ignition times, fuel injection times and exhaust gas feedback rates.

15. Device as defined in claim 1, wherein said processor means includes means for determining at least one additional operating parameter of said internal combustion engine.

* * * * *